(12) United States Patent
Besinger et al.

(10) Patent No.: US 8,163,392 B2
(45) Date of Patent: *Apr. 24, 2012

(54) METHOD FOR PRODUCING AN ELECTRONIC COMPONENT PASSIVATED BY LEAD FREE GLASS

(75) Inventors: Joern Besinger, Ludwigshafen (DE); Peter Brix, Mainz (DE); Oliver Fritz, Obersuessbach (DE)

(73) Assignee: Schott AG, Mainz (DE)

( * ) Notice: Subject to any disclaimer, the term of this patent is extended or adjusted under 35 U.S.C. 154(b) by 744 days.

This patent is subject to a terminal disclaimer.

(21) Appl. No.: 11/962,359

(22) Filed: Dec. 21, 2007

(65) Prior Publication Data

US 2008/0161178 A1 Jul. 3, 2008

(30) Foreign Application Priority Data

Dec. 27, 2006 (DE) .......................... 10 2006 062 428

(51) Int. Cl.
*B32B 17/06* (2006.01)
*B05D 3/02* (2006.01)

(52) U.S. Cl. ........ 428/426; 428/697; 428/701; 428/702; 427/126.2; 427/372.2; 427/532; 427/559

(58) Field of Classification Search .................. 428/426, 428/697, 701, 702; 427/126.2, 372.2, 532, 427/559

See application file for complete search history.

(56) References Cited

U.S. PATENT DOCUMENTS

| | | |
|---|---|---|
| 3,113,878 A | 12/1963 | Martin |
| 4,312,951 A | 1/1982 | Eppler |
| 6,403,506 B1 | 6/2002 | Kessler et al. |
| 2007/0009744 A1 | 1/2007 | Besinger et al. |

FOREIGN PATENT DOCUMENTS

| | | |
|---|---|---|
| CN | 1596228 | * 3/2005 |
| DE | 2 129 638 | 1/1972 |
| DE | 10 2004 041 357 | 3/2006 |
| DE | 10 2005 031 658 | 1/2007 |
| EP | 0 025 187 | 3/1981 |
| EP | 0 091 909 | 10/1983 |
| GB | 1 349 163 | 3/1974 |
| JP | 53-079469 | 7/1978 |
| JP | 54-119513 | 9/1979 |
| JP | 59-174544 | 10/1984 |
| JP | 05-301738 | 11/1993 |

OTHER PUBLICATIONS

CN1596228 abstract (http://www.chinatrademarkoffice.com/index.php/ptsearch).*
CN 1596228 English machine translation (http://www.chinatrademarkoffice.com/index.php/ptsearch).*
Irisawa CN 1596228 translation.*
M Shimbo et al: "Physical and Electrical Properties of Acid Resistive . . . " J Ceram. Soc. JPN. Inter. Ed. vol. 96, 1988, pp. 201-205 (in English).

* cited by examiner

*Primary Examiner* — Timothy Speer
*Assistant Examiner* — Lauren Robinson
(74) *Attorney, Agent, or Firm* — Michael J. Striker

(57) ABSTRACT

The method for producing glass-coated electronic components includes processing a lead-free glass with a liquid to form a suspension, applying the suspension on an electronic component body and subsequently sintering the component body with the suspension on it. The lead-free glass contains, in % by weight, $SiO_2$, 3-12; $B_2O_3$, 15-<25; $Al_2O_3$, 0-6; $Cs_2O$, 0-5; MgO, 0-5; BaO, 0-5; $Bi_2O_3$, 0-5; $CeO_2$, 0.01-1; $MoO_3$, 0-1; $Sb_2O_3$, 0-2 and ZnO, 50-65. The method can be used to passivate electronic components.

34 Claims, No Drawings

METHOD FOR PRODUCING AN ELECTRONIC COMPONENT PASSIVATED BY LEAD FREE GLASS

BACKGROUND OF THE INVENTION

The invention relates to a method for producing glass-coated electronic components and the use of said method for the passivation of electronic components.

Electronic components store, consume or transfer electrical net power, inter alia as passive components, such as electrical resistances, capacitors or also as coils. On the other hand, active electronic components are components which can add electrical net power to a signal. Active components are in particular semiconductors, such as diodes.

Diodes are semiconductor components in the field of electronics, characterised by their asymmetric characteristic current-voltage-curve which strongly depends on the current direction. Diodes are mainly used for rectification of alternating currents.

Common diodes, in particular diodes with little performance, consist of a silicon chip which is pre-passivated at the periphery and which consists of a contact between an n- and a p-semiconductor, connections of copper cover wires or, respectively, copper cover head pins and a glass tube which encapsulates the diode and the connection points. The contact between the chip and the connections is effected by pressure which is maintained by the glass tube.

The term "passivation of electrical components" means, inter alia, the application of a mechanically stable layer onto the final components or their casings.

In this case, the passivation protects the component from mechanical damaging and other detrimental influences caused by impurities, in particular for the further processing. Mostly, passivation of the electric components is effected by applying glass through dripping or vapour deposition. Therefore, passivation constitutes a mechanical protection of electric components, such as diodes and transistors, and, in addition, helps to stabilise the electrical properties. For example, applying the passivation layer is often the final coating step during the production of a semiconductor. In addition, for opto-electric components often a low-reflection layer is applied.

A passivation using glass is generally used for enhancing the quality and the reliability, of inter alia many kinds of Si-semiconductor components and of bipolar ICs up to power rectifiers.

Fused glass layers provide secure protection of the semiconductor surfaces from mechanical and chemical attack both during production and use, as already mentioned above. Due to their barrier and partial getter effect, they can also positively influence the electrical function of the components (blocking voltage, blocking currents).

The thermal expansion of silicon is about $3.3 \times 10^{-6}/K$, which is very low. Glasses having a similarly low thermal expansion have high viscosities and thus melting temperatures which are so high that they cannot be considered for use as passivation glasses. Thus, for passivation only special glasses with special properties can be used. The glasses must inter alia have a very good expansion adjustment, good electrical insulation and a dielectrical break-through resistance.

In most production technologies, the glass passivation is followed by glass chemical process steps, such as etching of contact windows and electrodeposition of contacts which can contribute to an attack on the glass. There are high differences in the chemical resistance of passivation glasses that are considered individually when selecting the type of glass.

In the prior art, a selection of standard passivation glasses is available which is used in practice.

U.S. Pat. No. 3,113,878 describes sealing the housing of electric components, the emphasis here being placed on devitrifying the sealing mass. It is true that in the sealing mass, a crystalline phase is present. Passivation of an electronic component with such a mass is not provided for. The crystalline phase can affect functioning of the component.

The passivation by means of glass is also known from EP 091 909 B1, whereby the glass composition as disclosed in particular does not contain ceroxid. Moreover, the composition contains alkali metal oxides having negative effects as these glasses act as ion conductor, in particular with increasing temperatures.

Moreover, the zinc borosilicate glasses described here tend to devitrify (crystallize).

EP 025 187 discloses a composition for ceramic glass frit having a low melting point and being lead-free and little water-soluble. The further field of application of the ceramic composition is in the area of decoration varnishing and in the use as a coating mass for glass and metal.

Chemically and electrically stable glasses from the system $PbO—ZnO—SiO_2—Al_2O_3—B_2O_3$ are known from the prior art [M. Shimbo, K. Furukawa, J. Ceram. Soc. Jpn. Inter. Ed. 96, 1988, pages 201-205] and are in the field of electronics amongst others used for the passivation of diodes. In this case lead oxide as a component generates a particularly high electric insulation in the glasses while, however, being environmentally unfriendly.

Zinc borosilicate glasses react most delicately of all glasses to all strong chemicals, such as acids and bases. Therefore, they are only used for vapour deposited contacts, an exception being their use in sinter glass diode technology, wherein during the galvanic tinning of the connection wires, also a noticeable removal of glass takes place. Zero-current nickelization is a special exposure for the passivation glasses. Only lead borosilicate glasses having melting temperatures of $\leq 700°$ C. can substantially withstand this procedure.

It is a disadvantage of the known passivization glasses that the majority of them contain a high percentage of lead oxide (PbO).

As lead oxide is—as mentioned before—a component that is detrimental to the environment and as there is legislation underway aiming to prohibit use of this component in electric and electronic apparatuses, there is a need for PbO-free glasses that are amongst others suitable for passivation of electronic components such as semiconductor components, in particular for the use with lead-free diodes.

By simply substituting lead oxide for one or more other ingredients which are sufficiently available, an economical reproduction of the desired technical glass properties which are influenced by PbO cannot be achieved. Methods for passivating electronic components having lead-free passivation glasses that comply with all further requirements to a passivating layer, and which do in particular not tend to devitrify, are not known from the prior art.

SUMMARY OF THE INVENTION

It is thus the object of the present invention to provide a method for the passivation of electronic components, the passivation glass being lead-free, not tending to devitrify, and avoiding the further disadvantages known from the prior art which moreover allows to apply the passivation layer onto the electronic component via simple method steps avoiding sophisticated post-processing steps.

The object is solved by a method for the production of a glass-coated passivated electronic component comprising the following steps:

processing a lead-free glass with a liquid to a suspension, wherein the glass contains the following composition (in % by weight);

| | |
|---|---|
| $SiO_2$ | 3-12 |
| $B_2O_3$ | 15-<25 |
| $Al_2O_3$ | 0-6 |
| $Cs_2O$ | 0-5 |
| $MgO$ | 0-5 |
| $BaO$ | 0-5 |
| $Bi_2O_3$ | 0-5 |
| $CeO_2$ | 0.01-1 |
| $MoO_3$ | 0-1 |
| $Sb_2O_3$ | 0-2 |
| $ZnO$ | 50-65 | applying the suspension onto an electronic component;
sintering the component.

In particular, the object is solved by a method, in which the processed lead-free glass contains the following composition (in % by weight):

| | |
|---|---|
| $SiO_2$ | 4-10.5 |
| $B_2O_3$ | 23-24 |
| $Al_2O_3$ | 0-4 |
| $Cs_2O$ | 0-4 |
| $MgO$ | 0-4 |
| $BaO$ | 0-4 |
| $Bi_2O_3$ | 0-3 |
| $CeO_2$ | 0.6 |
| $MoO_3$ | 0.5 |
| $Sb_2O_3$ | 0.5 |
| $ZnO$ | 57-62 |

In accordance with a preferred embodiment, the amount of $B_2O_3$ is in the range of 15 to <25% by weight, further preferably from 20 to <25% by weight, more preferably from 21.0 to <25% by weight and most preferably 23-24% by weight. Further suitable amounts of $B_2O_3$ are 15 to <24.2% by weight, preferably 20 to <24.2% by weight, more preferably 21.0 to <24.2% by weight.

A preferred range for the amount of $SiO_2$ is in the range of 3 to 11% by weight.

With respect to the component ZnO, a preferred amount in the glass composition is 55 to 62.5% by weight.

By adding little amounts of $CeO_2$, the devitrifying stability can be enhanced. Preferred ranges for this component are 0.01% by weight to 1% by weight, further preferred are 0.05% by weight to 0.8% by weight, further preferred are 0.2% by weight to 0.7% by weight and most preferred are 0.6% by weight.

Preferably the sum of $Sb_2O_3$, $MoO_3$ and $CeO_2$ is 0.1 to 4% by weight, more preferred 0.1 to 1.6% by weight.

According to preferred embodiments $Sb_2O_3$ is present within the passivation glass in amounts of from 0.05 to 2.0% by weight.

According to preferred embodiments, the passivation glasses used in accordance with the invention are poor in alkali, and more preferred alkali-free, as—in particular at a raised temperature—alkali metal iones diffuse from the glass into e.g. the chip and can thus affect the functionality of e.g. a diode. Apart from the usual impurities, the glasses are in particular free from the alkali metal oxides $Li_2O$, $Na_2O$ and $K_2O$.

Further, the invention describes the use of the method according to the present invention for the passivation of electronic components.

Furthermore, the invention discloses electronic components having an applied lead-free glass and the use of the component in electronic parts.

Surprisingly, the lead-free glass to be applied in the method has the technical glass properties which are desired for the passivation of electronic components, without using lead oxide for the production.

The WEEE (Waste Electrical and Electronic Equipment) directive stipulates that tinning of glasses has to be effected lead-free which results in higher temperatures during tinning. Surprisingly, this requirement is satisfied by the glass according to the present invention.

The lead-free glass is not affected by subsequent purification and processing steps and the electronic component is protected from mechanical damaging and other detrimental influences, such as impurities. Further, the lead-free glass remarkably helps to stabilise the electrical properties of the components. It has inter alia a sufficient acid resistance and results in an improvement of the expansion adjustment. Furthermore, the glass according to the present invention is nearly alkali-free and in spite of this, results in good electrical insulation and dielectrical break-through resistance.

For producing the glasses to be applied in the method according to the present invention, they may be provided as an iron-free glass powder which has been ground with low abrasion. Preferably, the glasses are provided in average grain size ranges of between 2.5 to 150 μm. The choice of the grain size range depends on the purpose of the use.

According to a preferred embodiment, the lead-free glass may at first be ground to a fine powder. The grain size is usually in the range of D50=0.7-15 μm, D99≦5-90 μm. Preferred grain sizes are D50=7-12 μm and D99≦35-65 μm. Then it may be processed to a suspension, preferably a paste, with a liquid, for example with water. The suspension and/or the liquid for the preparation of the suspension may contain further additives, for example ammonium perchlorate and/or nitric acid. Furthermore, alcohols, in particular multivalent and long chain ones, or organic binder systems, such as dispersions of acrylate polymerizates in alcohols, may already be contained in the suspension and/or the liquid beforehand.

The suspension may be applied to pre-manufactured electric component bodies. Applying the suspension onto the component bodies is preferably effected by dripping the glass powder suspension onto the component body, preferably comprising the contacts, such as molybdenum (Mo) or tungsten (W) contacts. A hermetically sealed glass body may be formed around the electric component by subsequent sintering. In this case, the sinter temperature is preferably 800° C. at the most, in particular preferably 690° C. at the most.

Further, in the case of for example the passivation of a wafer (glass application onto the Si-disk, prior to the isolation of single components), the glass powder can be applied by spin coating, doctor blading, sedimentation, centrifugation, electrophoresis, dispensing or by screen printing.

In a preferred embodiment of the invention, the suspension of ground glass and liquid and optional additives may be applied onto the component body as drops. In this case, the component body will preferably rotate when the suspension is applied. The component body may be any electronic component to be passivated or to be coated, in particular a semiconductor, such as a diode.

Preferably, the glass suspension should wet its fusion partners, for example metallic lead wires and electrodes and/or chips on Si-basis well, so that no cavities are generated during burning and to avoid the occurrence of exfoliation.

In a preferred embodiment, a galvanic tinning or also a dip-tinning of the electric lead wires may follow, wherein the then vitrified electric component may partially contact liquid tin or corrosives.

Within the scope of a good thermal adjustment to the electric lead wires, for example of Kovar (iron-nickel-cobalt alloy), or respectively. Dumet wires (Cu-cover wires), the electrodes of molybdenum and the chip on the basis of silicon, the thermal expansion of the sintered glass body is approximately 4.2 to $5.0 \times 10^{-6}$/K. In particular, the glass may have expansions in the range of from 4.6 to $4.8 \times 10^{-6}$/K. For the uses as a passivation of a wafer, it is preferable to use a passivation glass having a coefficient of thermal expansion of lower than 4.2 and of higher than 3 to achieve a better adjustment to silicon. For this purpose, the lead-free passivation glasses of the method according to the present invention may be mixed with an inert, ceramic filler having low or negative thermal expansion.

The terms "lead-free", "alkali-free" or generally "free from a component x" are to be understood in the sense of the present invention in such a way that these substances or their oxides are not added to the passivation glass as a component and are present in traces or as small remainders at the most.

EXAMPLES

Glasses used to be melted from conventional raw materials which are substantially alkali-free, except for unavoidable impurities, in inductively heated Pt/Rh-crucibles at 1.300° C. The melt used to be fined at this temperature for one hour, stirred for homogenization for 30 minutes at 1.300 to 1.050° C. and cast to ingots at 1.000° C. For producing the glass powders, the melt used to be passed through water-cooled metal rolls and subsequently the glass ribbon used to be ground.

Table 1 (1a to 1d) shows 15 examples of lead-free glasses which can be applied in the method according to the present invention, with their compositions (based on oxide in percent by weight) and their most important properties:

the coefficient of thermal expansion 20/300 in ppm/K
the glass transition temperature Tg in ° C.
the density in kg/m$^3$
the temperature at the beginning of the sintering of the glass powder in the gradient furnace in ° C.
the temperature of the microscopic softening of the glass powder in the gradient furnace in ° C.
the temperature at the end of the glass powder sintering in the gradient furnace in ° C.
the temperature of flattening of the glass powder in the gradient furnace in ° C.
the temperature at the beginning of the glass powder crystallisation in the gradient furnace in ° C.

In this case, the difference in temperature between the crystallisation and the flattening through flowing of the glass powder is an important parameter for evaluating the passivation glasses and should be as high as possible. On the one hand, the glasses should flatten at temperatures being as low as possible to create the glassy material of the protection layer under mild conditions, and on the other hand, an occurrence of crystallisation during the sintering process which would affect the properties of the passivation negatively is to be avoided.

Compared to the respective range of a composition containing lead as shown in a comparison with a prior art glass ("Comparison A" in Table 3), this processing range is good for the glasses according to the present invention in spite of renouncing in the use of lead oxide as a component.

EXAMPLES

TABLE 1

Examples 1 to 4

| | Example 1 | Example 2 | Example 3 | Example 4 |
|---|---|---|---|---|
| SiO$_2$ | 10.3 | 8.9 | 10.05 | 9.55 |
| B$_2$O$_3$ | 24 | 24.8 | 24.9 | 24.25 |
| Al$_2$O$_3$ | 0 | 0 | 0 | 0.5 |
| MgO | 2.8 | 1.3 | 1.65 | 3.8 |
| BaO | 0 | 0 | 0 | 0.1 |
| Bi$_2$O$_3$ | | | | |
| ZnO | 61.8 | 63.9 | 62.3 | 60.7 |
| CeO$_2$ | 0.6 | 0.6 | 0.6 | 0.6 |
| Sb$_2$O$_3$ | 0.5 | 0.5 | 0.5 | 0.5 |
| sum | 100 | 100 | 100 | 100 |
| CTE | 4.55 | 4.56 | 4.52 | 4.73 |
| Tg | 554 | 542 | 540 | 553 |
| density | 3,609 | 3,663 | 3,600 | 3,613 |
| beginning of sintering | 596 | 590 | 594 | 592 |
| microscopic softening | 601 | 598 | 603 | 599 |
| end of sintering | 623 | 614 | 619 | 627 |
| flattening temperature | 683 | 687 | 694 | 695 |
| crystallization | 700 | 710 | 705 | 709 |

TABLE 2

Examples 5 to 8

| | Example 1 | Example 2 | Example 3 | Example 4 |
|---|---|---|---|---|
| SiO$_2$ | 10.3 | 9.9 | 10.7 | 10 |
| B$_2$O$_3$ | 24.3 | 21.4 | 23.1 | 23.9 |
| Al$_2$O$_3$ | 0.5 | 1 | 1.5 | 0 |
| MgO | 2 | 2.8 | 3.4 | 0 |
| BaO | 1 | 0.3 | 0 | 0 |
| Bi$_2$O$_3$ | | | | 2.9 |
| ZnO | 60.8 | 63.5 | 60.2 | 62.1 |
| CeO$_2$ | 0.6 | 0.6 | 0.6 | 0.6 |
| Sb$_2$O$_3$ | 0.5 | 0.5 | 0.5 | 0.5 |
| sum | 100 | 100 | 100 | 100 |
| CTE | 4.72 | 4.69 | 4.69 | 4.50 |
| Tg | 550 | 548 | 562 | 557 |
| density | 3,602 | 3,709 | 3,626 | 3,830 |
| beginning of sintering | 592 | 586 | 596 | 574 |
| microscopic softening | 599 | 592 | 603 | 585 |
| end of sintering | 619 | 626 | 637 | 602 |
| flattening temperature | 697 | 679 | 678 | 689 |
| crystallization | 716 | 696 | 698 | 702 |

TABLE 3

Comparative Example A

| | A |
|---|---|
| SiO$_2$ | 36.8 |
| B$_2$O$_3$ | 13.1 |
| Al$_2$O$_3$ | 2.9 |
| MgO | |
| BaO | |
| Bi$_2$O$_3$ | |
| ZnO | |
| PbO | 47.2 |

TABLE 3-continued

Comparative Example A

|  | A |
| --- | --- |
| $CeO_2$ | |
| $Sb_2O_3$ | |
| sum | 100 |
| CTE | 4.73 |
| Tg | 553 |
| density | 3.613 |
| beginning of sintering | 592 |
| microscopic softening | 599 |
| end of sintering | 627 |
| flattening temperature | 695 |
| crystallization | 709 |

The invention claimed is:

1. A method for producing a glass-coated electronic component, said method comprising the following steps:
   i. processing a lead-free glass with a liquid to form a suspension, wherein the glass is free of lead and has a composition comprising, in % by weight;

| | |
   | --- | --- |
   | $SiO_2$ | 3-12 |
   | $B_2O_3$ | 15-<25 |
   | $Al_2O_3$ | 0-1.5 |
   | $Cs_2O$ | 0-5 |
   | MgO | 0-5 |
   | BaO | 0-5 |
   | $Bi_2O_3$ | 0-5 |
   | $CeO_2$ | 0.01-1 |
   | $MoO_3$ | 0-1 |
   | $Sb_2O_3$ | 0.05-2 |
   | ZnO | 50-65% | ii. applying the suspension onto an electronic component body; and then
   iii. sintering the component body.

2. The method according to claim 1, wherein the composition of the glass comprises, in % by weight:

| | |
   | --- | --- |
   | $SiO_2$ | 4-10.5 |
   | $B_2O_3$ | 15-24 |
   | $Al_2O_3$ | 0-1.5 |
   | $Cs_2O$ | 0-4 |
   | MgO | 0-4 |
   | BaO | 0-4 |
   | $Bi_2O_3$ | 0-3 |
   | $CeO_2$ | 0.6 |
   | $MoO_3$ | 0.5 |
   | $Sb_2O_3$ | 0.5 |
   | ZnO | 57-62. |

3. The method according to claim 1, wherein the composition of the glass comprises from 20% by weight to 23.9% by weight of $B_2O_3$.

4. The method according to claim 1, wherein the composition of the glass comprises from 3 to 11% by weight of $SiO_2$.

5. The method according to claim 1, wherein the composition of the glass comprises from 55 to 62.5% by weight of ZnO.

6. The method according to claim 1, wherein the composition of the glass is free from $Li_2O$, $Na_2O$ and $K_2O$.

7. The method according to claim 1, wherein the glass processed into the suspension is in the form of a ground glass powder.

8. The method according to claim 7, wherein the glass powder is iron-free and abrasion-resistant.

9. The method according to claim 7, wherein the glass powder has an average grain size range of 2.5 to 150 µm.

10. The method according to claim 1, further comprising first grinding the glass to form a fine powder having a grain size distribution with D50=0.7-15 µm and D99≦5-90 µm.

11. The method according to claim 1, wherein the liquid is water.

12. The method according to claim 1, wherein the suspension contains at least one further additive.

13. The method according to claim 12, wherein the additive is ammonium per-chlorate and/or nitric acid.

14. The method according to claim 1, wherein the suspension contains alcohols and/or organic binder systems.

15. The method according to claim 14, wherein the alcohols comprise multivalent and/or long-chain alcohols.

16. The method according to claim 14, wherein the organic binder systems comprise alcoholic dispersions of acrylate polymerizates.

17. The method according to claim 1, wherein the suspension is dripped onto a component body.

18. The method according to claim 1, wherein the electronic component is a semiconductor component.

19. The method according to claim 18, wherein the semiconductor component is a diode.

20. The method according to claim 1, wherein the sintering is performed with a sintering temperature that is 680° C. at the most.

21. The method according to claim 1, wherein the suspension completely covers fusion partners on the component body so that during burning no cavities are generated and/or no exfoliation occur.

22. The method according to claim 1, further comprising galvanic tinning or dip-tinning of electric lead wires after the sintering.

23. The method according to claim 1, wherein the glass is mixed with one or several inert, ceramic filling substances to be able to adapt to bending.

24. The method according to claim 1, wherein the glass is free from alkali metal oxides.

25. A method of passivating electronic components comprising the method according to claim 1.

26. The method according to claim 25, wherein diodes are passivated.

27. An electronic component having an applied lead-free glass layer, wherein the glass layer is free of lead and has a composition comprising, in % by weight:

| | |
   | --- | --- |
   | $SiO_2$ | 3-12 |
   | $B_2O_3$ | 15-<25 |
   | $Al_2O_3$ | 0-1.5 |
   | $Cs_2O$ | 0-5 |
   | MgO | 0-5 |
   | BaO | 0-5 |
   | $Bi_2O_3$ | 0-5 |
   | $CeO_2$ | 0.6-1 |
   | $MoO_3$ | 0-1 |
   | $Sb_2O_3$ | 0.05-2 |
   | ZnO | 50-65. |

28. The electronic component according to claim 27, consisting of a semiconductor component with said lead-free glass layer.

29. The electronic according to claim 28, wherein the semiconductor component is a diode.

30. The electronic component according to claim 27, wherein said composition comprises from 0.5 to 2.0% by weight of said $Sb_2O_3$.

31. The electronic component according to claim 27, wherein the glass layer is free of $Li_2O$, free of $Na_2O$ and free of $K_2O$.

32. The electronic component according to claim 27, wherein a sum total amount of $Sb_2O_3+MoO_3+CeO_2$ in said glass layer is from 0.6 to 4% by weight.

33. An electronic part comprising the electronic component according to claim 27.

34. An electronic component having an applied lead-free glass layer, wherein the glass layer is free of lead and has a composition comprising, in % by weight:

| | |
|---|---|
| $SiO_2$ | 4-10.5 |
| $B_2O_3$ | 15-24 |
| $Al_2O_3$ | 0-1.5 |
| $Cs_2O$ | 0-4 |
| MgO | 0-4 |
| BaO | 0-4 |
| $Bi_2O_3$ | 0-3 |
| $CeO_2$ | 0.6 |
| $MoO_3$ | 0.5 |
| $Sb_2O_3$ | 0.5 |
| ZnO | 57-62. |

* * * * *